United States Patent
Carlson et al.

(10) Patent No.: US 7,913,385 B2
(45) Date of Patent: Mar. 29, 2011

(54) METHOD OF ATTENUATING ELECTROMAGNETIC ENERGY

(75) Inventors: Ryan L. Carlson, Auburn, WA (US); Bruce J. Donham, Bothell, WA (US); Jim Sears, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 950 days.

(21) Appl. No.: 11/292,309

(22) Filed: Dec. 2, 2005

(65) Prior Publication Data

US 2007/0137117 A1   Jun. 21, 2007

(51) Int. Cl.
*H01B 19/00* (2006.01)

(52) U.S. Cl. ............... 29/887; 29/831; 29/832; 29/835; 29/841; 29/846

(58) Field of Classification Search ............... 29/887, 29/831, 832, 835, 841, 845, 846, DIG. 56; 244/159.1, 171.7, 786; 428/34; 361/818; 174/384, 381

See application file for complete search history.

(56) References Cited

U.S. PATENT DOCUMENTS

| | | | |
|---|---|---|---|
| 3,906,669 A | 9/1975 | Vorguitch | |
| 4,364,533 A | 12/1982 | Pompei et al. | |
| 4,541,595 A | 9/1985 | Fiala et al. | |
| 4,793,108 A * | 12/1988 | Bain et al. | 52/208 |
| 5,147,694 A * | 9/1992 | Clarke | 428/34 |
| 5,174,066 A * | 12/1992 | Dupuy | 49/502 |
| 5,271,581 A | 12/1993 | Irish | |
| 5,358,787 A | 10/1994 | Fontana et al. | |
| 5,367,956 A | 11/1994 | Fogle, Jr. | |
| 5,488,371 A | 1/1996 | Targove | |
| 5,670,742 A * | 9/1997 | Jones | 174/384 |
| 5,855,972 A | 1/1999 | Kaeding | |
| 6,168,112 B1 | 1/2001 | Mueller et al. | |
| 6,561,460 B2 * | 5/2003 | Rukavina et al. | 244/129.3 |
| 6,719,293 B1 | 4/2004 | Coles et al. | |
| 6,787,204 B2 | 9/2004 | Chaussade et al. | |
| 6,793,182 B2 * | 9/2004 | Hopkins et al. | 244/129.3 |
| 6,864,315 B1 | 3/2005 | Hakuta et al. | |
| 6,921,859 B2 * | 7/2005 | Hikita et al. | 174/381 |
| 7,350,753 B2 | 4/2008 | Guidon et al. | |
| 2003/0234322 A1 | 12/2003 | Bladt et al. | |
| 2004/0229607 A1 * | 11/2004 | La Chapelle et al. | 455/431 |
| 2005/0200934 A1 | 9/2005 | Callahan | |
| 2006/0038357 A1 | 2/2006 | Kamibayashiyama | |
| 2007/0045470 A1 | 3/2007 | Guidon et al. | |

FOREIGN PATENT DOCUMENTS

EP    1478106    11/2004
WO   WO2007064974   6/2007

* cited by examiner

*Primary Examiner* — A. Dexter Tugbang
*Assistant Examiner* — Tai Nguyen

(57) ABSTRACT

To attenuate electromagnetic energy, a capacitive bond between a window and a frame is provided by a capacitive coupling. This capacitive coupling includes an elastomeric matrix and a conductive media. The elastomeric matrix provides a seal between the window and the frame. The conductive media is bound to the matrix and conducts electromagnetic energy from the window to the frame.

6 Claims, 2 Drawing Sheets

METHOD OF ATTENUATING ELECTROMAGNETIC ENERGY

FIELD OF THE INVENTION

The present invention relates generally to conductive gasket for a commercial aircraft. More particularly, the present invention relates to a capacitive coupling that assists in attenuating electromagnetic propagation through commercial aircraft passenger windows, aircraft doors or the like.

BACKGROUND OF THE INVENTION

Aircraft windows and doors are two of the most common electromagnetic apertures inherent to most commercial aircraft designs. During operation of commercial aircraft, the aircraft is constantly bombarded by electromagnetic radiation or energy such as radio waves (RF). Commercial aircraft encounter various forms of electromagnetic radiation resulting from various sources. For example, a portion of the electromagnetic energy the commercial aircraft encounters during operation results from the portion of the aircraft communication systems wherein RF transmissions are sent and received, for example, when the aircraft communicates with ground stations or like, and vice versa. Other sources of electromagnetic energy include external sources such as cellular telephones and personal electronic devices (PEDs), which are oftentimes carried onto the aircraft by passengers, and utilized by the passengers, whether authorized or not, while in the cabin of the aircraft.

Use of the electronic devices by the passengers during taxiing of the aircraft for example, generates electromagnetic energy in the form of RF waves is transmitted through the aircraft's passenger windows to ground stations and/or other PEDs or cellular telephones. This transmission of electromagnetic energy through the passenger windows can interfere with the commercial aircraft's systems such as the communications system, posing a potential safety risk.

Accordingly, there are various preventative measures utilized in the art to accomplish the attenuation of propagation electromagnetic radiation such as RF waves, through commercial aircraft passenger windows. One current method or technique for attenuating electromagnetic propagation through commercial aircraft widows is "window shielding". The shielding of commercial aircraft passenger windows can be accomplished through various techniques, however each technique typically involves treating or shielding each individual window with some sort of material that reduces or hinders the propagation of electromagnetic energy. Such materials include the application of specialized acrylic layers, the application of specialized films and/or the application of metal mesh, to the individual passenger windows. The aforementioned window shielding techniques have drawbacks however.

These drawbacks include, for example, when the electromagnetic energy contacts the shielded passenger windows of the commercial aircraft, the passenger windows absorb the electromagnetic energy, attenuating the transmission through the windows as intended. However, as the electromagnetic energy increases, for example to the approximate 1-2 gigahertz range, the shielded windows begin to lose their attenuation characteristics. And due to this loss of attenuation, the commercial aircraft passenger windows begin to resonate and retransmit the electromagnetic energy.

Accordingly, in order to alleviate or minimize the resonation and retransmission problems inherent in the above-described window shielding techniques, the windows the are additionally fitted with a gasket or otherwise hard coupled to the commercial aircraft frame. The gasket or couplings function to bond or ground the individual windows to the commercial aircraft frame. This connection assists to facilitate and provide a capacitive coupling between each individual passenger window and the aircraft frame. This capacitive coupling allows for the electromagnetic energy that may result from the resonation of windows for example, to be transferred to the aircraft frame where it is transferred or dissipated across the entire aircraft frame structure.

The gaskets or couplings, while they minimize the retransmission of electromagnetic energy, shielded passenger windows, also have drawbacks. First, the current gaskets or coupling are very expensive and therefore are oftentimes limited to military platforms. Second, the gaskets or couplings are subject to wide temperature variations, which cause the gaskets or couplings to corrode. This corrosion of the gaskets causes the windows to lose their capacitive characteristics. And finally, some of the proposed gaskets or couplings have a less than aesthetically pleasing appearance.

Accordingly, it is desirable to provide a cost effective method and apparatus for attenuating electromagnetic propagation through aircraft passenger windows or the like. More particularly, it is desirable to provide inexpensive, corrosive resistant gasket that facilitates a capacitive coupling between the individual aircraft passenger windows and the aircraft frame.

SUMMARY OF THE INVENTION

The foregoing needs are met, to a great extent, by the present invention, wherein in one aspect an apparatus is provided that in some embodiments attenuates electromagnetic energy.

An embodiment of the present invention pertains to a capacitive coupling for providing a capacitive bond between a window and a frame. This capacitive coupling includes an elastomeric matrix and a conductive media. The elastomeric matrix provides a seal between the window and the frame. The conductive media is bound to the matrix and conducts electromagnetic energy from the window to the frame.

Another embodiment of the present invention relates to a system for attenuating electromagnetic energy. The system includes a window, frame, and gasket. The window includes an electrically conductive layer to attenuate the electromagnetic energy from a predetermined low value to a predetermined high value. The frame includes an electrically conductive material. The gasket seals the window to the frame and provides a capacitive coupling between the window and the frame. The gasket is configured to provide a conductive path from the window to the frame prior to an amount of electromagnetic energy in the window exceeding the predetermined high value.

Yet another embodiment of the present invention pertains to a method of attenuating electromagnetic energy in an interior of a vehicle. The vehicle includes a body and a window. The window includes a frame and a window pane. In this method, the window pane is shielded to attenuate the electromagnetic energy, the window pane is capacitively coupled to the frame, and the frame is conductively connected to the body.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
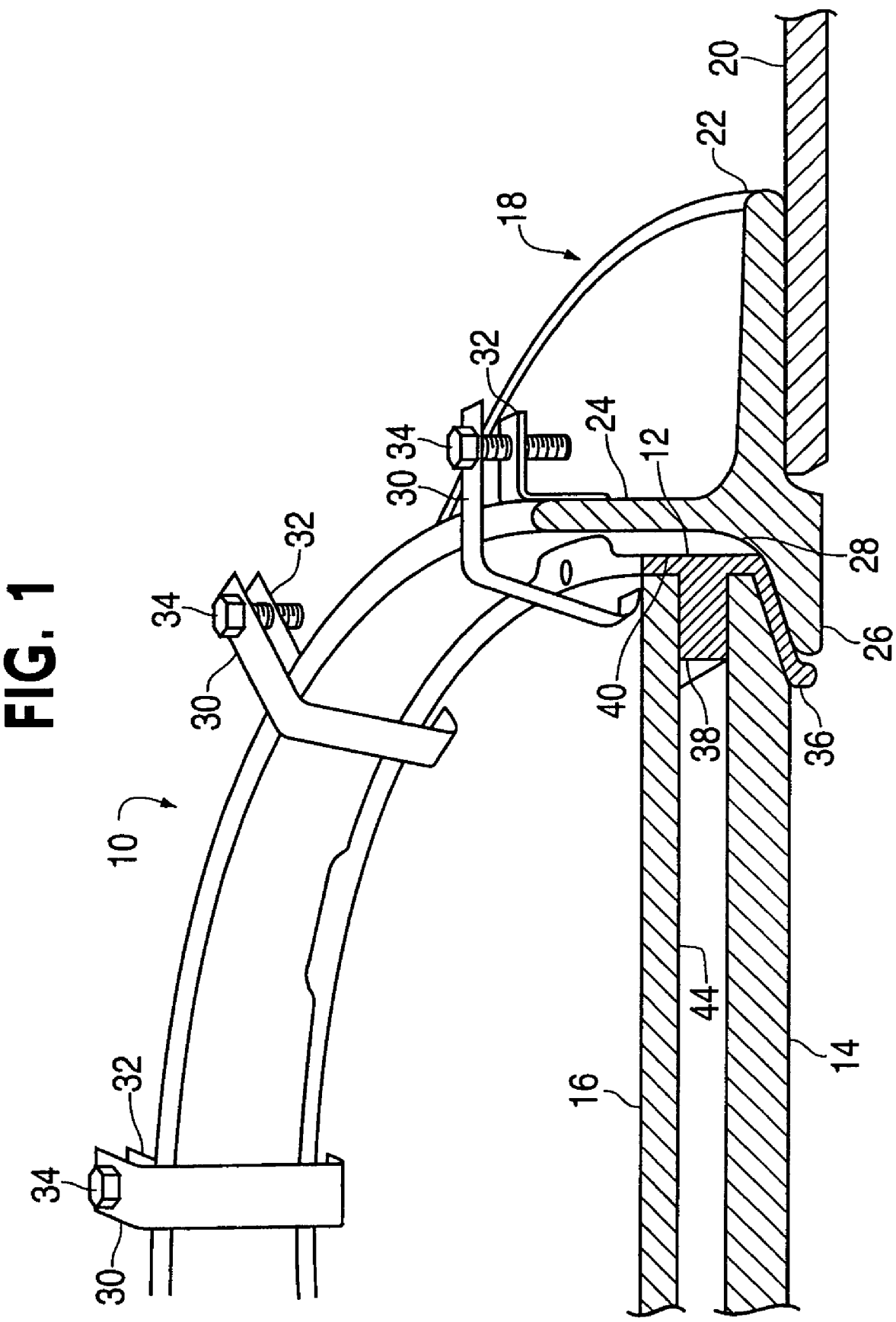
FIG. 1 is a cross-sectional perspective view of a window mounting illustrating a RF shielded window, capacitively coupled to the window mounting, according to a preferred embodiment of the invention.

The invention will now be described with reference to the drawing figures, in which like reference numerals refer to like parts throughout. An embodiment in accordance with the present invention provides a capacitive gasket for use with commercial aircraft or the like, that helps to mitigate propagation of electromagnetic energy, for example, RF waves, through aircraft apertures such as passenger windows and doors. More particularly, an embodiment of the present invention provides an inexpensive, corrosive resistant gasket that facilitates a capacitive coupling between aircraft passenger windows and the aircraft frame that assists in the attenuation of the transmission of RF waves through commercial aircraft passenger windows or the like.

Referring now to FIG. 1, a commercial aircraft window mounting, generally designated 10, in accordance with an embodiment of the present inventive apparatus and method, is illustrated. The commercial aircraft window mounting 10 includes a capacitive gasket 12 positioned between a first, outer window 14 and a second, inner window 16. The commercial aircraft mounting 10 additionally includes the widow forging, generally designated 18 that is configured to mate with an airframe 20 of the aircraft. The window forging 18 includes a generally horizontal portion 22 and a generally vertical portion 24. The window forging 18 also includes a base portion 26 that extends in opposing relationship to the generally horizontal portion 22. The base portion 26 extends opposite the horizontal portion 22 as previously discussed, and provides a downwardly sloping surface 28.

As illustrated in FIG. 1, the commercial aircraft window mounting 10 further includes a series of spring clips 30 positioned about the periphery of the window forging 18. The commercial aircraft window mounting 10 also has a series of mounting flanges 32 and a series of mechanical attachment means 34, for example bolts, also positioned about the periphery of the forging 18. The mounting flanges 32 are connected to, and extend from, the vertical portion 24 of the window forging 18. The mounting flanges 32 are positioned about the periphery of the window forging 18 as illustrated in FIG. 1, and combine with the spring clips 30 and the bolts 34 to mount the gasket 12 and outer and inner windows 14, 16 to the window forging 18.

Figure 2:
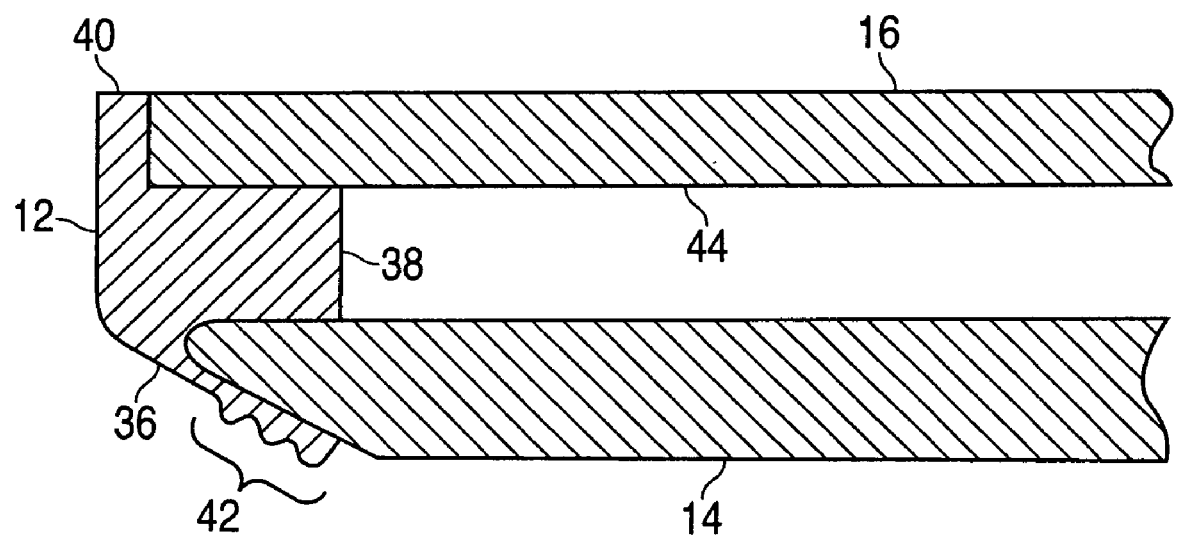
FIG. 2 is a cross-sectional view of a capacitive gasket in accordance with an embodiment of the present invention.

Referring now to FIGS. 1 and 2, a cross-sectional view of the gasket 12 is illustrated. As depicted in FIGS. 1 and 2, the gasket 12 encircles the outer window 14 and inner window 16 and provides a circumferential bond between the outer and inner windows 14, 16 and the window forging 18. The gasket 12 is a capacitive gasket that provides a capacitive bond between the windows 14, 16 and the window forging 18. The gasket 12 includes a lower portion or section 36, a mid-section or portion 38 and an upper portion or section 40.

As illustrated in FIGS. 1 and 2, the lower section 36 of the gasket 12 extends from the mid-section 38 of the gasket 12 at an angle in a downwardly direction, away for the window forging 18. The aforementioned geometry of the lower section 36 of the gasket 12 generally mirrors or compliments the downwardly sloping surface 28 of the base portion 26. The lower section 36 includes a series of ridges, generally designated 42, that extend outwardly from the lower section 32. As depicted in FIGS. 1 and 2, the mid-section 38, as the name suggests, occupies the middle portion of the gasket 12 and functions as a spacer between the outer window 14 and inner window 16. The upper portion 40 extends upwardly from the mid-section 38, generally parallel to the vertical section 24 of the window forging 18.

In various embodiments, the gasket 12 includes a conductive media that is bound by an elastomeric matrix. The conductive media includes any suitable strongly, weakly, and semi-conductive materials. Specific examples of conductive materials include conductive carbon black, aluminum, silver, and the like. The elastomeric matrix includes ethylene propylene diene monomer (EPDM) and the like. In one embodiment of the present invention, the capacitive gasket 12 includes a carbon black media in an EPDM or other such elastomeric matrix. Alternatively, the gasket 12 may include silver and/or aluminum flakes in an EPDM or other such elastomeric matrix. The carbon black media provides greater than 20 dB to about 45 dB of RF wave shielding in the range of from about 80 MHz to approximately 18 GHz of the electromagnetic spectrum. The silver and/or aluminum flake media provides approximately 10 dB to about 47 dB of RF wave shielding in the range of from about 80 MHz to approximately 18GHz of the electromagnetic spectrum.

As previously discussed, during operation of commercial aircraft for example, the aircraft encounters electromagnetic energy in the form of RF radiation from external sources. This RF radiation can interfere with the operation of the commercial aircraft systems such as the communication system and the navigation system. Accordingly, in order to attenuate the propagation of RF radiation through the commercial aircraft passenger windows, techniques such as shielding are implemented to reduce electromagnetic propagation. During the shielding process and, prior to assembly of the window mounting 10 the windows are treated with a film or material that absorbs electromagnetic energy. As illustrated in FIG. 1, the inner window 16 has been shielded or treated, as generally designated by reference numeral 44, with a film or other material that that reduces or attenuates the propagation of electromagnetic radiation. The shielding 44 includes any suitable film, layer, and/or treatment operable to absorb, attenuate, or otherwise reduce the propagation of electromagnetic energy. Suitable examples of the shielding 44 include conductive films, meshes, and the like.

The shielded inner window 16 combines with the gasket 12 to reduce electromagnetic propagation through the passenger windows of a commercial aircraft. As previously discussed, the shielded window 16 absorbs electromagnetic radiation, however as the electromagnetic energy increases, for example, to approximately 1 GHz to approximately 2 GHz, the window may begin to lose its attenuation characteristics and begin to resonate and retransmit the electromagnetic energy. To avoid such instances, the gasket 12 provides a capacitive coupling between the inner window 16 and the commercial aircraft frame, dissipating the electromagnetic energy onto the aircraft frame. In this regard, the gasket 12 includes a material having a dielectric constant, permittivity, and/or resistance such that the gasket 12 is configured to discharge electromagnetic energy from the window 16 to the window forging 20 prior to resonance of the window 16. That is, the window 16 is configured to absorb electromagnetic energy until the energy exceeds a predetermined maximum amount of energy. If the window 16 were remain electrically isolated past this predetermined maximum amount of energy, the window 16 may transmit RF energy. The gasket 12 is configured to conduct electromagnetic energy or electricity from the window 16 to the window forging 18 prior to the amount of energy in the window 16 exceeding the predetermined maximum. The gasket 12 further assists the attenuation electromagnetic radiation by absorbing some of the electromagnetic energy as heat.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of attenuating electromagnetic energy in an interior of a vehicle, the vehicle comprising a body and a window mounting, the vehicle body comprising an airframe, the window mounting comprising a window forging and at least one of an inner and outer window, the method comprising:

shielding at least one of the inner and outer windows with a shielding such that at least one of the inner and outer windows absorbs the electromagnetic energy to attenuate the electromagnetic energy;

sealing at least one of the inner and outer windows to the window forging with a capacitive gasket in direct contact with the shielding;

capacitively coupling at least one of the inner and outer windows to the window forging with the capacitive gasket such that the electromagnetic energy is electromagnetically transferred from at least one of the inner and outer windows to the window forging; and conductively connecting the window forging in to the airframe such that the electromagnetic energy is electrically conducted from the window forging to the airframe.

2. The method according to claim 1, wherein the capacitive gasket comprises a conductive media and an elastomeric matrix.

3. The method according to claim 1, further comprising:
attenuating 20 dB of electromagnetic energy in the range of about 80 MHz to about 18 GHz.

4. The method according to claim 3, further comprising:
attenuating more than 20 dB of electromagnetic energy in the range of about 1 GHz to about 2 GHz.

5. A method of attenuating electromagnetic energy in an interior of a vehicle, the vehicle comprising a body and a window mounting, the vehicle body comprising an airframe, the window mounting comprising a window forging and at least one of an inner and outer window, the method comprising:

shielding at least one of the inner and outer windows such that at least one of the inner and outer windows absorbs the electromagnetic energy to attenuate the electromagnetic energy;

capacitively coupling at least one of the inner and outer windows to the window forging such that the electromagnetic energy is electromagnetically transferred from at least one of the inner and outer windows to the window forging;

conductively connecting the window forging to the airframe such that the electromagnetic energy is electrically conducted from the window forging to the airframe; and conducting electromagnetic energy from at least one of the inner and outer windows to the frame prior to at least one of the inner and outer windows absorbing a predetermined maximum amount of electromagnetic energy.

6. The method according to claim 1, wherein the step of capacitively coupling at least one of the inner and outer windows to the window forging comprises:

dissipating electromagnetic energy onto the window forging.

* * * * *